UNITED STATES PATENT OFFICE.

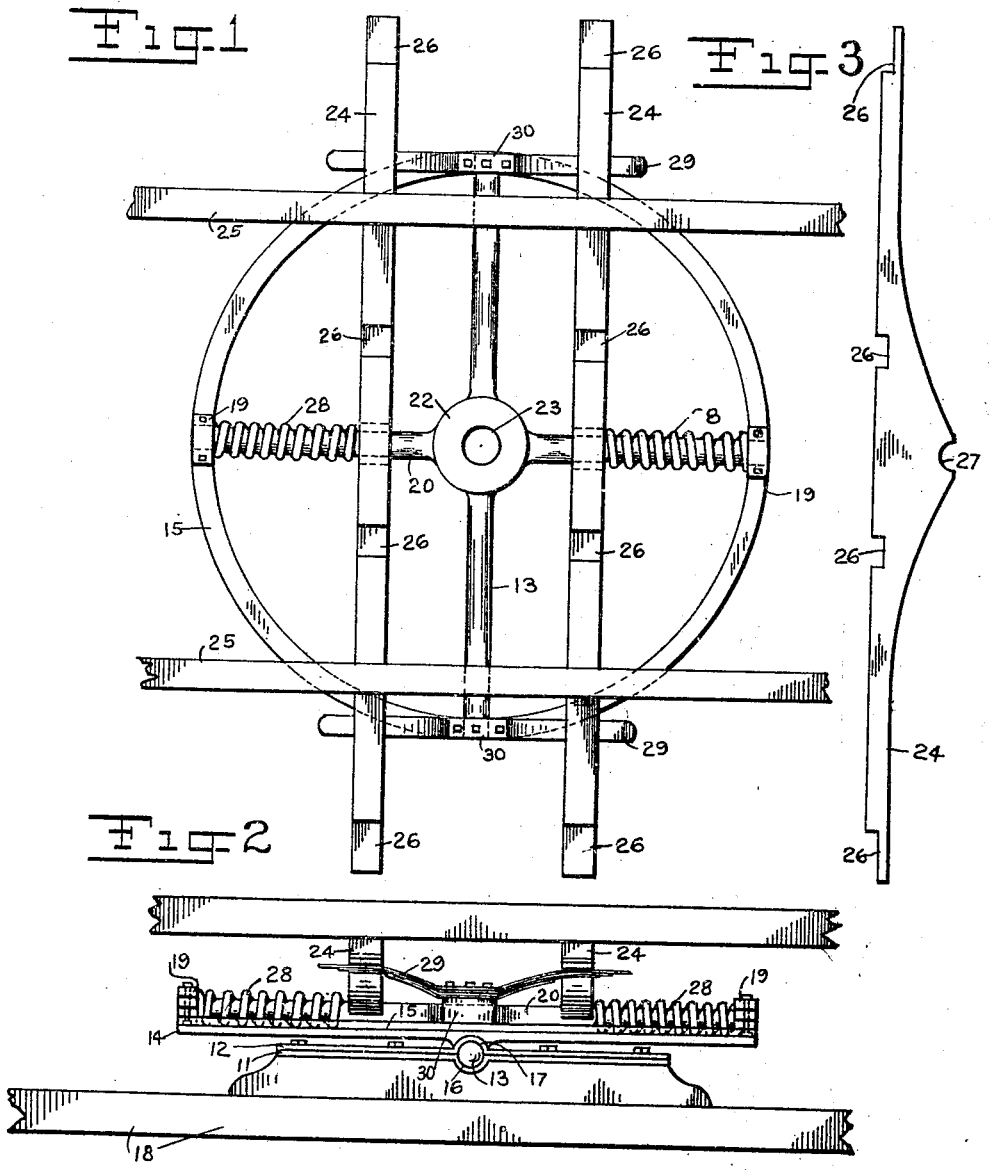

WILLIAM OSCAR SHADBOLT, OF BROOKLYN, NEW YORK.

FIFTH-WHEEL FOR VEHICLES.

1,245,277.  Specification of Letters Patent.  Patented Nov. 6, 1917.

Application filed June 12, 1917. Serial No. 174,272.

*To all whom it may concern:*

Be it known that I, WILLIAM OSCAR SHADBOLT, a citizen of the United States, and a resident of the borough of Brooklyn, in the city and State of New York, have invented certain new and useful Improvements in Fifth-Wheels for Vehicles, of which the following is a specification.

The invention relates to fifth wheels, such as are employed for pivotally connecting the front axles of vehicles to the body of the vehicle or to a reach thereon; or for the purpose of connecting together a tractor and trailer; and has for its principal object to provide such a fifth wheel in which certain of the disadvantages of such devices previously known shall be overcome, and which shall possess certain advantages over such prior devices, as hereinafter set forth.

The invention consists in the novel construction, arrangement and combination of various devices, elements and parts, as shown in the accompanying drawings and hereinafter more particularly described.

In the said drawings, Figure 1 is a plan view of my invention; Fig. 2 is a side elevation thereof; and Fig. 3 is a detail view of one of the members thereof, as hereinafter described.

In carrying my invention into effect in the embodiment thereof which I have selected for illustration in the accompanying drawings and description in this specification, I provide lower and upper annular fifth wheel members, designated 14 and 15 respectively. To the lower member 14 is secured a laterally extending bar 13, the ends of which extend between plates 11 and 12, separated at 16 and 17 to receive the ends of said rod 13; the plates 11 and 12 being rigidly secured to the front running gear of the truck, or to a tractor, as the case may be, said running gear or tractor being designated 18. (See Fig. 2.)

Secured to the upper annular member 15 at the front and rear thereof, are clamps 19, in which are secured the ends of a rod 20, provided if desired with shoulders adapted to prevent it from moving longitudinally with relation to said member 15. The central portion of the rod 20 is provided with a flat enlarged portion 22 having a central perforation 23, which portion 22 and perforation 23 are adapted to coincide with similar parts on the rod 13. A king bolt or the like may be passed through the perforation 23 and the corresponding lower perforation, by which means the members of the fifth wheel may be pivotally secured together.

I provide members 24, adapted to support beams 25 (only two of which are shown) which beams 25 are adapted to support the floor of the truck. A view of one of these members 24, detached from the other parts of the fifth wheel, is shown in Fig. 3, where it will be observed that inset portions 26 are provided in its upper surface, adapted to receive the beams 25. At the center of the lower side of the member 24 I provide a socket 27 adapted to rest over the rod 20, by means of which the body of the truck, or the trailer, as the case may be, is supported. Springs 28 are provided, surrounding the rod 20, and acting between the members 24 and the clamps 19 and annular member 15. The lower side of the member 24 may be faced with metal if desired.

If desired, semi-elliptical springs 29 or the like may be provided, secured on supports 30 to the upper fifth wheel member 15, and bearing against the members 24.

The operation of my invention is as follows: The lower fifth wheel member, laterally pivotally mounted over the front running gear of a truck, or upon a tractor; and the upper fifth wheel member, longitudinally pivoted to the main portion of the truck, or to the trailer, by virtue of the latter resting by means of the members 24 upon the bar 20; when pivoted together form a universal jointed fifth wheel, by the use of which the tractor and trailer, or the front and rear portions of the truck, as the case may be, may move relatively to each other and accommodate themselves to inequalities in the roadbed. The springs 28 allow of a certain amount of relative longitudinal movement between the tractor and trailer, or between the front and rear portions of the truck, thus taking up a portion of the shock of a sudden starting or stopping of the vehicle; and their location within the periphery of the fifth wheel member 15 permits a fifth wheel of larger diameter to be employed, or a fifth wheel pivoted nearer to the front of the trailer or the load carrying body of the truck, than would otherwise be the case. This improved construction makes it possible, by reason of the smaller and more compact arrangement of parts, without the use of members projecting beyond the periphery of the fifth wheel members, to use the same in connection with a tractor having large or high rear wheels, as the trailer may be connected to the tractor if desired at or near a point between the rear wheels of the tractor and still be free to trail at any angle without interference with the said rear wheels by any part of the fifth wheel construction.

The advantages of my invention will be obvious. I do not limit myself to this exact construction, as the same might be modified in various respects, without departing from the spirit and scope of my invention.

Having thus described my invention, what I claim as new and desire to secure by Letters Patent is as follows:

1. A fifth wheel comprising an upper member and a lower member, said members being adapted to be pivotally secured together, one of said members being slidably mounted with relation to a vehicle; and resilient means located within one of said members and adapted to act between said member and said vehicle.

2. A fifth wheel comprising a member having a rod extending thereacross, means operatively connected with said rod within said member whereby said member is slidably secured to a portion of a vehicle, a spring acting between said means and said member, and a second member adapted to be pivotally secured to said first named member and to be secured to a portion of a vehicle.

3. A fifth wheel comprising a member having a rod extending diametrically thereacross and longitudinally of a vehicle, means operatively connected with said rod within said member whereby said member is slidably secured to a portion of vehicle, a spring surrounding said rod and acting between said means and said member, and a second member adapted to be pivotally secured to said first named member and to be secured to a portion of a vehicle.

4. A fifth wheel comprising a member having a rod extending thereacross, means connected with said rod within said member whereby said member is pivotally and slidably secured to a portion of a vehicle, a spring acting between said means and said member, and a second member adapted to be pivotally secured to said first named member, and to be secured to a portion of said vehicle by means of pivoting means at right angles to the means whereby said first named member is pivoted.

5. A fifth wheel comprising a member having a rod extending diametrically thereacross and longitudinally of a vehicle, means operatively connected with said rod within said member whereby said member is longitudinally pivotally and slidably secured to a portion of a vehicle, a spring acting between said means and said member, and a second member adapted to be pivotally secured to said first named member and to be transversely pivotally secured to a portion of a vehicle.

6. A fifth wheel comprising a member having a rod extending diametrically thereacross and longitudinally of a vehicle, said rod being vertically centrally perforated, means operatively connected with said rod within said member whereby said member is longitudinally pivotally and slidably secured to a portion of a vehicle, a spring acting between said means and said member, a second member, a rod secured thereto and extending diametrically thereof and transversely of a vehicle, said rod being vertically centrally perforated, means operatively connected with said rod whereby said second named member is transversely pivotally secured to a portion of a vehicle, and a bolt adapted to pass through the perforations in said rods and to pivotally secure said members together.

In witness whereof I have hereunto signed my name this 8th day of June, 1917.

WILLIAM OSCAR SHADBOLT.

Copies of this patent may be obtained for five cents each, by addressing the "Commissioner of Patents, Washington, D. C."